United States Patent Office 2,969,933
Patented Jan. 31, 1961

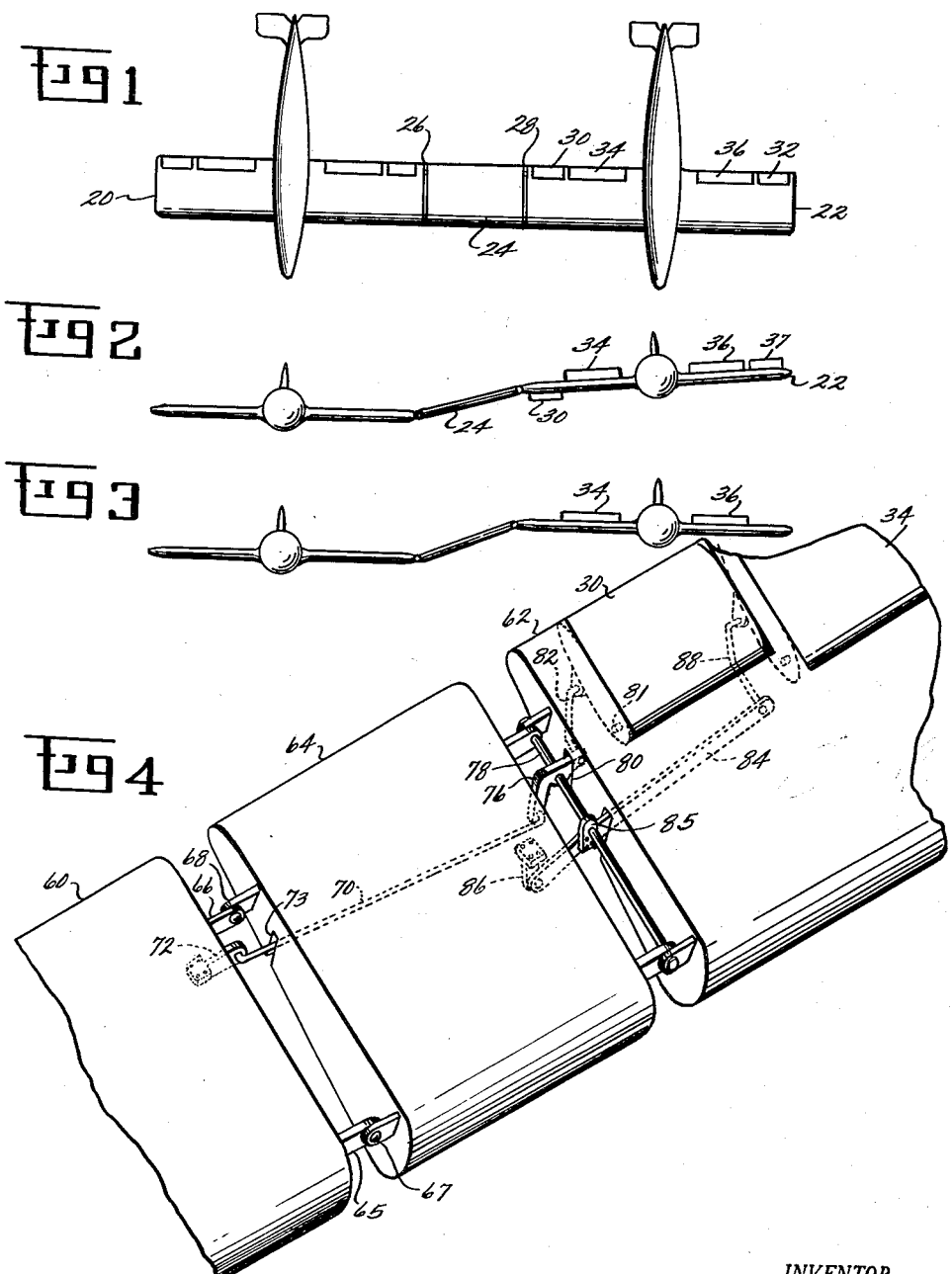

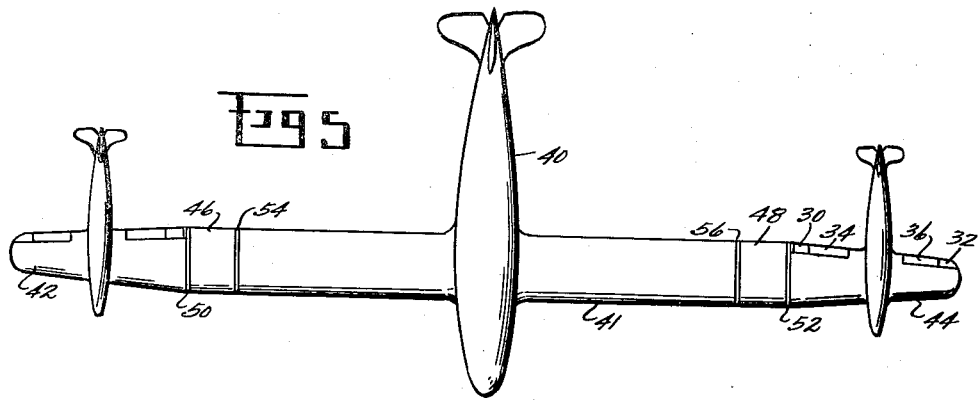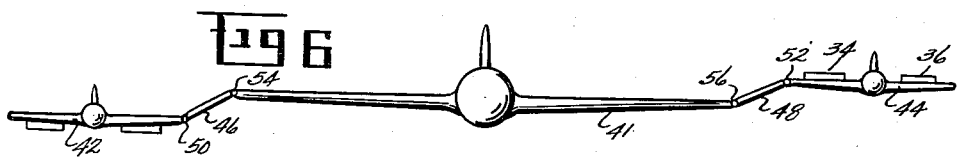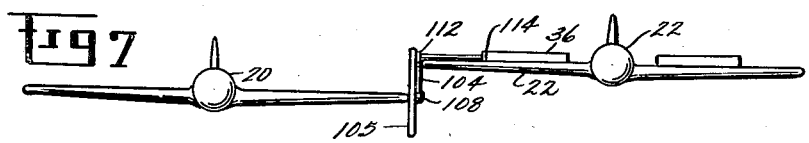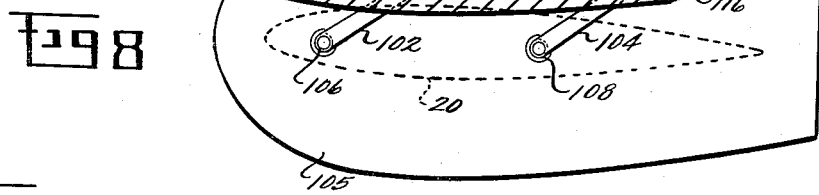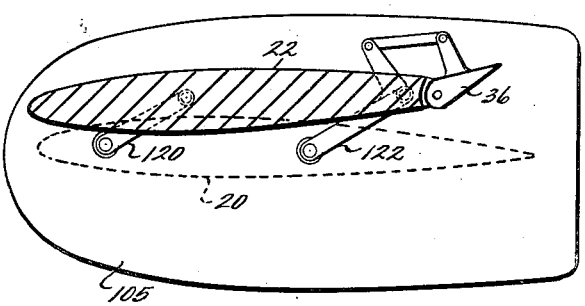

2,969,933

LINKING AIRPLANES AND WINGS OF AIRPLANES

Richard Vogt, Medway, Ohio, assignor to the United States of America as represented by the Secretary of War Filed Oct. 2, 1951, Ser. No. 249,382

11 Claims. (Cl. 244—2)

(Granted under Title 35, U.S. Code (1952), sec. 266)

This invention relates to pivotally joining either two or more airplanes at their wing tips or adding free floating wing sections at the tips of an airplane whereby said pivotal connection will allow one of said airplanes or said free floating wing section to move in a vertical or dihedral angular direction with respect to the other airplane.

The gross weight of the airplane and aerodynamic lift/drag ratio are two factors which limit the performance of the airplane as to its maximum load carrying capacity and range. The gross weight of the airplane can only be reduced by a reduction in the structural weight which is possible only to a limited extent. The aerodynamic drag of the wing is made up of the profile drag, which is essentially the skin friction of the air on the wing, and induced drag which is that drag whose magnitude is dependent on the aspect ratio. For a higher aspect ratio, the drag coefficient is less than for a wing of smaller aspect ratio. Therefore it is desirable to increase the aspect rato, which is the ratio of the span to the mean cord, and reduce the drag for airplanes which are required to fly at high altitudes and for large heavily loaded aircraft. However the increase in aspect ratio is limited by the increase in structural weight of the wing which soon offsets the benefit of drag reduction. Also there is an increase in bending moments which increases as the square of the semispan. Therefore, with a given airplane the rapid increase in structural weight soon offsets any improvement in drag reduction due to an increase of aspect ratio. For practical reasons of structural strength the aspect ratio is limited to approximately 12.

In accordance with the present invention, a wing of higher aspect ratio is provided by hingedly joining wing sections together, thereby preventing shear forces from being transferred from one section to another in addition to bending forces. The present invention is an improvement over my copending application Serial Number 72,-467 which discloses the sections connected by a single hinge, whereby shear forces, due to the lift center and gravity center failing to coincide, are transferred in the single hinge arrangement which makes for very uncomfortable flying conditions, and although the bending forces have been eliminated, which reduce the structural weight, the shear forces that still exist tend to increase the structural weight. The present invention eliminates the shear forces from being transferred in addition to the bending forces by inserting a link panel with hinges at each end in place of the single hinge connection to provide a double hinge arrangement between the sections.

It is, therefore, an object of this invention to increase the load carrying capacity and range of heavily loaded aircraft by either reducing the structural weight or reducing the drag or both to a certain extent.

In other words it is another object of this invention to increase the aspect ratio for a given wing.

It is a further object of this invention to provide a wing construction of hingedly connected sections whereby no bending forces or shear forces are transferred from one section to another.

Another further object of this invention is to provide a connection between an airplane wing tip and another airplane wing tip, or a free floating wing section and another airplane, that will permit free relative dihedral angular movement and free relative vertical displacement between the airplane wing tip and wing sections.

A still further object of this invention is to provide separate automatic control means in the additional airplane or wing section, one for controlling the relative dihedral angular movement and the other for controlling the relative vertical displacement between the two airplanes or floating wing section and airplane.

These and other objects will become apparent when read in light of the description and the accompanying drawings wherein like parts have the same numbers.

Figure 1 is a plan view showing two airplanes connected together by a link panel.

Figure 2 is a front view showing dihedral angular displacement.

Figure 3 is a front view showing the sections vertically displaced.

Figure 4 shows two wing sections connected together by a link panel with an automatic control system for actuating the ailerons and flaps.

Figures 5 and 6 show an airplane with two floating sections connected to a central wing section by link panels.

Figures 7 and 8 show a modified form of the subject invention.

Figure 9 shows another embodiment of the subject invention.

Referring to Figures 1 to 3, airplane 20 is hingedly connected to airplane 22 by being pivotally connected to link panel 24. The link panel 24 presents a double hinge connection for the airplanes 20 and 22 so that they may have free relative motion in a vertical direction and also have free relative dihedral angular displacement. The hinged lines connecting the airplanes 20 and 22 to the link panel 24 are represented at 26 and 28. Airplane 22 is provided with ailerons 30 and 32 and flaps 34 and 36 for automatically controlling any vertical displacement or dihedral angular displacement from a predetermined position. The automatic control means will be hereinafter described in further detail.

Referring to Figures 5 and 6 cargo airplane 40 has link panels 46 and 48 pivotally connected to its central wing section 41 at 54 and 56. Free floating wing sections 42 and 44 are pivotally connected to the outboard side of link panels 46 and 48 at 50 and 52 thereby forming a double hinge connection between the central wing section 41 and free floating wing sections 42 and 44. Link panels 46 and 48 and floating wing sections 42 and 44 are substantially parallel to the chord of the central wing section 41. The free floating sections are provided with ailerons 30 and 32 and flaps 34 and 36 which automatically control any displacement from a predetermined vertical position and dihedral angle.

Whenever the load changes when a bomb has been dropped or when gas has been spent from one of the outer aircraft wing sections 22 or 44, or when the aircraft suddenly encounters a sudden gust of wind a vertical displacement or dihedral angular displacement will result. For example, in Figures 2, 3 and 5, the vertical displacement will automatically be controlled by the flaps 34 and 36 tending to return the airplane to its predetermined position in the case of a gust of wind and ailerons 30 and 32 will automatically tend to return the airplane from a dihedral angular displacement to a new predetermined position in the case of a load change thereby maintaining the two sections under predetermined flight conditions even though the load characteristics on the wing sections change.

The automatic control means may be effectuated in different ways either by cables as disclosed in the patent to Van Dusen, 2,385,392, or by a mechanical means such as shown in Figure 4 where two wing sections 60 and 62 are hingedly connected to a link panel 64 by brackets 65, 66, 67 and 68. The aileron control comprises a link 70 pivotally connected to section 60 by a bracket 72 located below the hinge line formed by brackets 65, 66, 67 and 68. The link 70 extends through an opening 73 in the link panel 64 and is pivotally connected to a bell crank 76, said bell crank being mounted on hinge bolt 78. The bell crank 76 extends through an opening 80 in section 62 and is pivotally connected to a lever 82, said lever 82 being fastened to aileron 30. The flap control comprises a link 84 having a rigid bracket 85 thereon pivotally mounted on the hinge bolt 78. Said link 84 is pivotally mounted at one end on a bracket 86 connected to the link panel 64, and at the other end is connected to a lever 88 which is in turn connected to the aileron 34.

In operation whenever a dihedral angular displacement occurs, for example, upward, as shown in Figure 2, link 70 being pivotally mounted below the hinge line of brackets 65, 66, 67 and 68 at 72, will tend to pull on bell crank 76 thereby pulling on link 82 connected to aileron 30 and make aileron 30 pivot about its hinge point 81. In the event of any vertical displacement as shown in Figure 3 between sections 60 and 62 in an upward direction the link 84 will restrain lever 88 from moving while section 62 moves upward which will in turn force flaps 34 upward, since link 84 is always parallel with panel 64, thereby returning the displaced section to its predetermined position.

Referring to the embodiment of the invention shown in Figures 7 and 8, two airplanes 20 and 22 are pivotally connected together through equal length links 102 and 104, said links are pivotally connected to airplane 20 at one end at 106 and 108 and pivotally connected to airplane 22 through universal ball joints 109 and 111 at the other end. A vertical panel 105 separates the two airplanes 20 and 22 to prevent air pressure beneath the wing from leaking around the wing tips as this would defeat the objects of the invention and not reduce the induced drag. Integral with link 104 is an upstruck arm 110 which has an offset link 112 pivotally connected thereto. Said link 112 is pivotally connected to an arm 114 connected to flap 36 which in turn has a pivotal axis 116. In operation, any upward vertical displacement of airplane 22 in relation to airplane 20 will move links 102 and 104 about their respective pivot points 106 and 108 in a counterclockwise direction. This movement will be translated through upstruck arm 110, link 112 and arm 114 to rotate flap 36 upward about its pivot 116 thereby returning the airplane 22 to its predetermined position. The dihedral angular displacement of airplane 22 about the universal ball joints 109 and 111 may be controlled by cables or by the aileron control shown in Figure 4.

The lift or angle of attack of the floating wing sections or hinged airplanes may be controlled by either using lift flaps as shown in Figure 4 or by changing the relative angle of attack of the wing section or hinged airplane as shown in the embodiment of Figure 9 wherein the links 120 and 122 are of unequal length. Upon upward movement of airplane 22, a reduction of the angle of attack of airplane 22 will result since link 122 is larger than link 120 and will give greater movement to the aft portion of the wing section than to the forward portion. The dihedral angular displacement about the universal joints 109 and 111 may be controlled as shown and described in Figure 4.

In this manner cargo planes may carry an additional weight since a higher aspect ratio construction will decrease the structural wing weight. Also the cargo plane can fly longer distances since the additional wing sections may carry additional gasoline.

It is apparent the specific embodiments of the invention shown above have been given by way of illustration and not by way of limitation and that the structures above described are subject to wide variation and modification without departing from the scope or spirit of the invention, all of which variations and modifications and equivalents thereof are to be included within the scope of the present invention.

Whereby I claim:

1. A high aspect ratio wing construction for aircraft to attain a maximum load carrying ability with minimum structural weight comprising at least two spanwise extending wing panels each adapted to carry a substantial portion of the disposable load of the aircraft, a link panel pivotally connected at each end to each of said wing panels thereby eliminating the transfer of shear and bending forces, and permitting a free relative dihedral angular movement and free vertical movement between said wing panels from a predetermined vertical and angular alignment, and aerodynamic control surface means for restoring said wing panels to substantially said predetermined angular alignment.

2. A hingedly connected wing panel construction comprising a plurality of wing panels, a two directional movement connection between said panels, said movement being in vertical and dihedral angular directions, control surface means in the wing panels responsive to vertical and dihedral angular displacement from a predetermined flying position.

3. In an airplane having a high aspect ratio wing construction comprising a plurality of wing sections, spanwise double hinge means connecting said wing sections together to form a complete wing, automatically operated flaps and ailerons in said wing sections responsive to changes in alignment of the wing sections for controlling the dihedral angle and vertical displacement between the sections.

4. In an aircraft, the combination of a center wing section with a floating wing section on each side connected spanwise with link panels therebetween, one of said link panels being pivotally connected to an end of one of said floating wing sections and to the center wing section, another of said link panels being pivotally connected to an end of another of said floating wing sections and to the center wing section, whereby free relative dihedral angular displacement and vertical displacement between the wing sections is provided, thereby eliminating the transmittal of bending and shear forces at said pivotal connections and permitting a wing of higher aspect ratio than if said wing panels and link panels were a solid wing, said wing panels having flaps and ailerons responsive to angular displacement between said panels and automatically returning said panels to a predetermined position.

5. An aircraft wing comprising an inner section, free dihedral angular displacement and vertical displacement outer sections pivotally connected to link panels, said link panels being pivotally connected to said inner section, said inner section being relatively stationary to said outer sections, said outer sections having flaps and ailerons responsive to movement from a predetermined position whereby said outer sections are returned to said predetermined position upon movement therefrom.

6. In combination, an airplane having link panels pivotally connected to each wing tip of said airplane, and floating wing sections pivotally connected to said link panels, said floating wing sections having flaps and ailerons to automatically correct for dihedral angular displacement and vertical displacement due to lift and weight changes, said floating wing sections transmitting no shear and bending forces to said wing tips through said pivotal connection thereby permitting a larger aspect ratio wing construction than if it were a solid wing construction.

7. An aircraft wing construction including a central wing section, unrestrained free floating wing sections pivotally connected to the outer ends of link panels which are pivotally connected to the outer ends of said central wing section, the pivotal connections of said floating wing sections and link panels being substantially parallel to the chord of the central wing section, whereby bending moments and shear forces are not transferred from the floating sections to the central wing section, control means in said floating wing sections adapted upon displacement thereof from a neutral position to return said floating wing sections to said neutral position.

8. In combination two airplanes pivotally connected at their wing tips to each end of a link panel, ailerons and flaps in the wings of one of said airplanes and having control means connected thereto for automatically aligning the airplanes when displaced from a predetermined relative position between said airplanes.

9. A hinged sectional wing panel construction comprising a plurality of wing panels, a two directional movement connection between said panels, said movement of one panel being in vertical and dihedral angular directions with respect to the other panel, aerodynamic means in one of said panels connected to separate control means, one control means being responsive to said vertical displacement and the other control means being responsive to said dihedral angular displacement, said control means being adapted upon movement from a predetermined relative position between the panels to return said panels to its predetermined position.

10. A high aspect ratio wing construction of airfoil cross-section including wing panels disposed in spanwise alignment with a linking panel positioned between said wing panels and pivotally connected to each adjacent wing panel to permit free vertical displacement and dihedral angular movement of the wing panels with respect to each other, an aerodynamic means on at least one of said wing panels and having a control means therefor responsive to vertical displacement of said wing panel relative to said other wing panel for varying the lift on one of said wing panels to restore the hinge axis thereof to a predetermined neutral position, and other aerodynamic means carried by said one wing panel and having a control means therefor responsive to a dihedral angular displacement of said one wing panel with respect to said other wing panel to vary the lift of the said one wing panel to restore the same to a predetermined dihedral angular relation with respect to the other said wing panel.

11. A high aspect ratio wing construction of airfoil cross-section including a central wing panel, a pair of wing tip panels each disposed in spanwise alignment with the central wing panel at opposite ends thereof and a linking panel positioned between each wing tip panel and the central wing panel and pivotally connected to the associated wing tip panel and to the central wing panel to permit free vertical displacement and dihedral angular movement of the wing tip panels with respect to the central wing panel, an aerodynamic means on each wing tip panel and having a control means therefor responsive to vertical displacement of said wing tip panel relative to said central wing panel for varying the lift on said wing tip panel to restore the hinge axis thereof to a predetermined neutral position and other areodynamic means carried by each said wing tip panel and having a control means therefor responsive to a dihedral angular displacement of said wing tip panel with respect to said central wing panel to vary the lift of the associated wing tip panel to restore the same to a predetermined dihedral angular relation with respect to the central wing panel.

References Cited in the file of this patent

UNITED STATES PATENTS

| | | |
|---|---|---|
| 2,105,307 | Akerman | Jan. 11, 1938 |
| 2,582,118 | Haller | Jan. 8, 1952 |